United States Patent [19]

Wollensak

[11] 3,919,333

[45] Nov. 11, 1975

[54] ALKYLATION PROCESS

[75] Inventor: John C. Wollensak, Bloomfield Hills, Mich.

[73] Assignee: Ethyl Corporation, Richmond, Va.

[22] Filed: Mar. 12, 1974

[21] Appl. No.: 450,418

[52] U.S. Cl. ...... 260/624 R; 260/612 R; 260/623 R
[51] Int. Cl.[2] .................. C07C 39/06; C07C 39/27
[58] Field of Search ........... 260/624 C, 612 R, 625, 260/626 R, 619, 624 R, 623 R, 612 D

[56] References Cited
UNITED STATES PATENTS

| | | | |
|---|---|---|---|
| 2,448,942 | 9/1948 | Winkler et al. | 260/621 R |
| 2,681,371 | 6/1954 | Gaydasch et al. | 260/624 R |
| 2,831,898 | 4/1958 | Ecke et al. | 260/624 |
| 2,841,623 | 7/1958 | Norton et al. | 260/624 |
| 3,221,060 | 11/1965 | Albert et al. | 260/619 R |

FOREIGN PATENTS OR APPLICATIONS

| 944,014 | 6/1956 | Germany | 260/624 |
|---|---|---|---|

*Primary Examiner*—James O. Thomas, Jr.
*Assistant Examiner*—W. B. Lone
*Attorney, Agent, or Firm*—Donald L. Johnson; Robert A. Linn; Joseph D. Odenweller

[57] ABSTRACT

Phenols are alkylated by reaction with primary or secondary alkanols containing two or more carbon atoms in the presence of alkali metal hydroxides at elevated temperatures.

24 Claims, No Drawings

ALKYLATION PROCESS

BACKGROUND OF THE INVENTION

Alkylated phenols are useful as antioxidants in a broad range of organic materials. In the past, they have been prepared by various means such as by the reaction of an appropriate phenol with an olefin or alkyl halide in the presence of an acid or metal halide Friedel-Crafts catalyst. According to another method, phenols are alkylated with olefins selectively in an ortho position using an aluminum phenoxide catalyst (Ecke et al., U.S. Pat. No. 2,831,898). Phenols have also been alkylated by aldehydes in an alcohol solvent in the presence of a strong base (Norton et al., U.S. Pat. No. 2,841,623).

SUMMARY

According to the present invention, phenols are alkylated in an open ortho or para position by reaction with a primary or secondary alkanol containing 2 or more carbon atoms in the presence of an alkali metal hydroxide at elevated temperatures without adding aldehyde, which the prior art teaches to be essential. The process is especially useful for introducing a primary alkyl group. The process is operable on tert-alkyl-substituted phenols without extensive dealkylation such as is encountered using acidic catalysts.

DESCRIPTION OF THE PREFERRED EMBODIMENTS

A preferred embodiment of the invention is a process for alkylating the nucleus of a phenol, said process consisting essentially of reacting an alkanol containing from 2 to 30 carbon atoms, said alkanol selected from the group consisting of primaray and secondary alkanols, with a phenol having an unsubstituted nuclear position ortho or para to the phenolic hydroxyl group in the presence of an alkali metal hydroxide at a temperature of 175°–350°C.

The process is applicable to a broad range of phenols. All that is required is that there be at least one unsubstituted, except for hydrogen, position ortho or para to the phenolic hydroxyl group. Useful phenols include any hydroxy aromatic having an open position on the hydroxy-substituted benzene ring in the ortho or para positions. These include both mono- and polynuclear phenols as well as phenols substituted with such groups as alkyl, chloro, fluoro, alkoxy, and the like. Examples of useful phenols include phenol, propylphenol, polypropylphenol, polybutylphenol, resorcinol, hydroquinone, catechol, cresol, xylenol, amylphenol, hydroxydiphenyl, benzylphenol, phenylethylphenol, methylhydroxydiphenyl, guiacol, alpha-naphthol, betanaphthol, benzylnaphthol, anthranol, phenylmethylnaphthol, phenanthrol, phenoxyphenol, chlorophenol, p-pentacontylphenol, o-(α-methylbenzyl)phenol, 2,6-dicyclohexylphenol, 7-hydroxyindole, 7-hydroxyisobenzofuran, 4-hydroxybenzoisoxazole, 6-hydroxycoumarin, 6-hydroxy-8-fluorocoumarin, 6,8-dichloro-β-naphthol, 6-hydroxy-quinoline, 4-hydroxyacenaphthene, 4-hydroxy-7-methylacenaphthene, 4-hydroxy-6,8-difluoroacenaphthene, 1-hydroxyfluorene, 1-hydroxy-2,4-di-sec-amylfluorene, 1-hydroxydibenzopyrrole, α-hydroxyanthracene, 1-hydroxyxanthene, 1-hydroxyphenazine, 4,4′-methylenebisphenol, and 4,4′-bisphenol.

The more preferred phenols are the mononuclear phenols which can also be referred to as hydroxybenzenes. Examples of these are phenol, p-cresol, meta-cresol, o-cresol, p-phenylphenol, p-chlorophenol, p-fluorophenol, p-methoxyphenol, p-ethoxyphenol, p-butoxyphenol, o-chlorophenol, o-fluorophenol, 2,6-dimethoxyphenol, o-tert-butylphenol, o-sec-butylphenol, 2,6-di-sec-butylphenol, 2,6-di-tert-butylphenol, 2,6-dimethylphenol, 2,4-dimethylphenol, p-sec-dodecylphenol, o-cyclohexylphenol, 2,6-dicyclohexylphenol, o-cyclopentylphenol, 4-sec-eicosylphenol, 4-sec-triacosylphenol, 4-sec-tetracosylphenol, and 4-sec-pentacosylphenol.

The benefits of the process are most evident when the starting phenol is an alkylphenol, especially when it is a mononuclear alkylphenol. The alkyl substituent(s) may contain from 1 to about 20 carbon atoms and there may be from 1 to about 3 such alkyl groups as long as there remains an open ortho or para position. In a highly preferred embodiment the alkylphenol is a tertiary alkylphenol such as o-tert-butylphenol, 2,6-di-tert-butylphenol, 2,4-di-tert-amylphenol, p-tert-octylphenol, 2-tert-dodecylphenol, 2,6-di-tert-dodecylphenol, 2,6-di-tert-eicosylphenol, and the like. The most preferred starting phenol is 2,6-di-tert-butylphenol.

Useful alkanols are the primary and secondary alkanols containing two or more carbon atoms. Especially useful alkanols are those containing from 2 up to about 20 carbon atoms. Of these, the most preferred groups are the linear or normal alkanols. Surprisingly, it was found that the process goes poorly with methanol. Examples of useful alkanols are ethanol, n-propanol, isopropanol, n-butanol, isobutanol, sec-butanol, n-hexanol, 2-tert-butanol, n-octanol, 2-ethylhexanol, n-decanol, sec-decanol, 2-ethyloctanol, 2-ethyldecanol, n-dodecanol, n-hexadecanol, n-octadecanol, n-eicosanol, n-docosanol, n-tetracosanol, n-hexacosanol, n-octacosanol, n-triacontanol, and the like.

Of the above, the preferred alkanols are the primary alkanols containing from 2 to about 20 carbon atoms such as ethanol, n-propanol, isobutanol, n-butanol, n-hexanol, 2-ethylhexanol, n-octanol, n-decanol, n-dodecanol, n-tetradecanol, n-hexadecanol, n-octadecanol, n-eicosanol, and the like. Of these, the most preferred are the normal primary alkanols containing from 2 to about 20 carbon atoms.

The alkali metal hydroxides include lithium hydroxide, sodium hydroxide, potassium hydroxide, rubidium hydroxide, cesium hydroxide, and francium hydroxide. The more preferred are sodium hydroxide and potassium hydroxide, with potassium hydroxide being the most preferred.

The amount of base can vary over a wide range. A useful operating range is from 0.05–1 mole of alkali metal hydroxide per mole of alkanol. Preferably the amount of base is sufficient to form a saturated solution in the alkanol.

The amount of alkanol can vary over a wide range. A useful operating range is from 1–20 moles of alkanol per mole of phenol. A preferred range is from 2–6 moles of alkanol per mole of phenol, and a most preferred range is from 3–5 moles of alkanol per mole of phenol.

When the amount of alkanol relative to phenol is high it is preferred that the amount of base be likewise on the high side of the operative range. Preferably, there should be about 0.1–2 moles of alkali metal hydroxide per mole of phenol, and more preferably about 0.5–1 mole of alkali metal hydroxide per mole of phenol.

The process proceeds at elevated temperatures. A useful operating range is about 175°–350°C. A preferred range is about 200°–300°C. When the starting phenol is a tert-alkyl-substituted phenol a preferred operating range is about 200°–250°C.

The reaction is conducted by merely mixing the phenol, alkanol and alkali metal hydroxide and heating the mixture, generally under an inert atmosphere. It is not necessary nor is it recommended to add an aldehyde or to use a further catalyst such as the copper screen used in Norton et al., U.S. Pat. No. 2,841,623.

The reaction is generally conducted in a closed pressure vessel to prevent loss of reactants. The pressure encountered varies with the reactants. With ethanol the pressure ranges from about 800 to 1200 psig, with n-butanol from about 600 to 800 psig, and with n-dodecanol from about 100 to 400 psig. A further advantage of the present process over the prior art methods which employ copper metal is that the pressures do not rise as far in the present process, thus permitting use of less expensive equipment.

The following examples serve to illustrate the manner in which the pressure is conducted.

EXAMPLE 1

In an autoclave was placed 601 grams of 2,6-di-tert-butylphenol, 137.1 grams KOH and 540.9 grams of ethanol. The vessel was flushed with nitrogen, sealed and heated to 235°C. with stirring. Pressure reached 520 psig. Stirring was continued at 235°C. for 8 hours, during which period the pressure rose to 1030 psig. The autoclave was cooled, vented, and the contents discharged into a water quench. The water-washed product was dried over anhydrous magnesium sulfate and volatile materials stripped under vacuum over a steam bath. The mixture contained 73.8 weight per cent 2,6-di-tert-butyl-4-ethylphenol and 11.3 weight per cent unreacted 2,6-di-tert-butylphenol. The product was recovered by distillation.

EXAMPLE 2

This example is included to show that, surprisingly, the reaction does not proceed to any extent with methanol.

In an autoclave was placed 695 grams of 2,6-di-tert-butylphenol, 435.5 grams methanol and 157.1 grams of KOH. The vessel was flushed with nitrogen, sealed, and heated to 235°C. It was maintained at this temperature with stirring over an 8 hour period, after which it was cooled, vented, discharged and water washed and found by gas chromatograph to contain only 1.2 per cent 2,6-di-tert-butyl-4-methylphenol. These results indicate that the present process is completely different from and proceeds through an entirely different mechanism than that described by Norton et al., in U.S. Pat. No. 2,841,623.

EXAMPLE 3

In an autoclave was placed 497.5 grams 2,6-di-tert-butylphenol, 720.3 grams of n-butanol and 111.2 grams of KOH. The vessel was flushed with nitrogen, sealed and, while stirring, heated to 235°C. (250 psig). Stirring was continued at this temperature for an 8 hour period, during which time pressure rose to 540 psig. The mixture was then cooled and the autoclave vented. The contents were discharged into aqueous HCl sufficient to neutralize the base. The organic product was diluted with ether and dried over magnesium sulfate. The ether was evaporated off and volatiles removed under vacuum over a steam bath. The product analyzed 3.2 weight percent n-butanol, 5.3 weight percent unreacted 2,6-di-tert-butylphenol and 85.4 weight percent 2,6-di-tert-butyl-4-n-butylphenol, giving a yield of 75.5 percent.

The above examples show the process carried out with 2,6-di-tert-butylphenol, KOH and ethanol or n-butanol. These procedures may be readily modified to adapt the process to any of the previously described reactants. The following examples illustrate such modifications.

EXAMPLE 4

In an autoclave place 108 grams p-cresol, 558 grams n-dodecanol and 168.3 grams KOH. Flush the autoclave with nitrogen, seal and heat to 275°C. Stir at this temperature for 6 hours, cool and vent. Discharge the autoclave and wash the reaction mixture with water until neutral. Distill under vacuum to recover as the main product 2,6-di-n-dodecyl-4-methylphenol containing minor amounts of 2-n-dodecyl-4-methylphenol.

The above example can be carried out using NaOH in place of KOH. Likewise, other alcohols can be substituted in place of n-dodecanol. For example, n-octanol yields mainly 2,6-di-n-octyl-4-methylphenol. Likewise, n-decanol yields mixtures of 2-n-decyl-4-methylphenol and 2,6-di-n-decyl-4-methylphenol. Similarly, n-tetradecanol forms mainly 2,6-di-n-tetradecyl-4-methylphenol. Use of n-hexadecanol leads to production of mixtures of 2-n-hexadecyl- and 2,6-di-n-hexadecyl-4-methylphenol. Likewise, use of n-octadecanol leads to formation of mixtures of 2-n-octadecyl- and 2,6-di-n-octadecyl-4-methylphenol.

EXAMPLE 5

In an autoclave place 144 grams α-naphthol, 538 grams n-octadecanol and 112 grams KOH. Flush with nitrogen, seal and heat to 250°C. while stirring. Stir at 250°C. for 8 hours. Cool, vent, discharge and water wash the reaction mixture until neutral. Distill out unreacted α-naphthol and n-octadecanol under vacuum, leaving a residual product consisting mainly of 2-n-octadecyl-α-naphthol, 4-n-octadecyl-α-naphthol and 2,4-di-n-octadecyl-α-naphthol.

EXAMPLE 6

In an autoclave place 124 grams p-methoxyphenol, 510 grams 2-ethylhexanol and 100 grams NaOH. Flush with nitrogen, seal and, while stirring, heat to 250°C. Hold at that temperature for 10 hours. Cool, vent and discharge the product. Wash the mixture until neutral and distill under vacuum to recover 2-n-hexyl-4-methoxyphenol and 2,6-di-n-hexyl-4-methoxyphenol.

EXAMPLE 7

In an autoclave place 145 grams p-chlorophenol, 230 grams ethanol and 150 grams KOH. Flush with nitrogen, seal and heat to 200°C. Stir at that temperature for 12 hours. Cool, vent and discharge the autoclave. Water wash the product until neutral and distill under vacuum to recover 2-ethyl-4-chlorophenol and 2,6-diethyl-4-chlorophenol.

In similar fashion other phenols may be used in the above examples. Use of 4'-isopropylidine bisphenol and n-decanol yields a mixture of 2,6,2'- and 6'-n-decyl-substituted 4,4'-isopropylidine bisphenol. Likewise, β-naphthol plus isobutanol gives isobutyl-substituted β-naphthols.

The products made by this process are useful antioxidants. For example, 2,6-di-tert-butyl-4-ethylphenol is an excellent stabilizer for polyethylene and other polyolefins such as polypropylene, SBR rubber, ethylenepropylene terpolymer, and the like. A useful concentration in the organic substrate is from about 0.05 to 0.5 weight percent. It can be used in place of the known antioxidant 2,6-di-tert-butyl-p-cresol in applications where an antioxidant of lower volatility is desired.

I claim:

1. A process for alkylating the nucleus of a phenol, said process comprising reacting a primary alkanol containing from 2 to 30 carbon atoms with a phenol having an unsubstituted nuclear position ortho or para to the phenolic hydroxyl group, without adding aldehyde or copper, said phenol being selected from the group consisting of unsubstituted phenols and phenols substituted with hydrocarbon, halogen or alkoxy groups, in the presence of an alkali metal hydroxide at a temperature of 200°–300°C and obtaining as the product said phenol having a primary $C_{2-30}$ alkyl group in said ortho or para position.

2. A process of claim 1 wherein said phenol is a mononuclear alkyl-substituted phenol, there being from 1 to 3 of said alkyl groups, each containing from 1 to 20 carbon atoms.

3. A process of claim 2 wherein said alkyl-substituted phenol is a 2,6-di-tert-alkylphenol.

4. A process of claim 3 wherein said 2,6-di-tert-alkylphenol is 2,6-di-tert-butylphenol.

5. A process of claim 4 wherein said alkali metal hydroxide is potassium hydroxide.

6. A process of claim 5 wherein said alkanol is ethanol.

7. A process of claim 5 wherein said alkanol is n-propanol.

8. A process of claim 5 wherein said alkanol is n-butanol.

9. A process of claim 5 wherein said alkanol is n-hexanol.

10. A process of claim 5 wherein said alkanol is n-octanol.

11. A process of claim 5 wherein said alkanol is n-decanol.

12. A process of claim 5 wherein said alkanol is n-dodecanol.

13. A process of claim 2 wherein said alkyl-substituted phenol is a 4-alkylphenol.

14. A process of claim 13 wherein said 4-alkylphenol is 4-methylphenol.

15. A process of claim 14 wherein said alkali metal hydroxide is potassium hydroxide.

16. A process of claim 15 wherein said alkanol is n-octanol.

17. A process of claim 15 wherein said alkanol is n-decanol.

18. A process of claim 15 wherein said alkanol is n-dodecanol.

19. A process of claim 15 wherein said alkanol is n-tetradecanol.

20. A process of claim 15 wherein said alkanol is n-hexadecanol.

21. A process of claim 15 wherein said alkanol is n-octadecanol.

22. A process of claim 1 wherein said alkali metal hydroxide is potassium hydroxide.

23. A process of claim 1 wherein said alkali metal hydroxide is sodium hydroxide.

24. A process of claim 1 wherein said primary alkanol is a normal primary alkanol containing from 2 to about 20 carbon atoms.

* * * * *

UNITED STATES PATENT AND TRADEMARK OFFICE
CERTIFICATE OF CORRECTION

PATENT NO. : U.S. 3,919,333
DATED : November 11, 1975
INVENTOR(S) : John C. Wollensak It is certified that error appears in the above—identified patent and that said Letters Patent are hereby corrected as shown below:

Column 5, Claim 2, line 1, delete "1" and insert -- 24 --.

Signed and Sealed this seventeenth Day of February 1976

[SEAL]

Attest:

RUTH C. MASON
Attesting Officer

C. MARSHALL DANN
Commissioner of Patents and Trademarks